United States Patent
Cardona et al.

(10) Patent No.: US 8,118,049 B2
(45) Date of Patent: Feb. 21, 2012

(54) SAFETY SYSTEM FOR FLUID CONDUIT

(76) Inventors: Robert D. Cardona, Cinnaminson, NJ (US); Paul E. Weil, Jr., Clementon, NJ (US)

(*) Notice: Subject to any disclaimer, the term of this patent is extended or adjusted under 35 U.S.C. 154(b) by 927 days.

(21) Appl. No.: 12/079,865

(22) Filed: Mar. 28, 2008

(65) Prior Publication Data

US 2009/0242042 A1  Oct. 1, 2009

(51) Int. Cl.
  *F16K 17/14* (2006.01)
  *G05D 16/06* (2006.01)
(52) U.S. Cl. .................... 137/69; 137/613
(58) Field of Classification Search ............... 137/87.01, 137/68.11, 67, 68.14, 69, 71; 138/104
  See application file for complete search history.

(56) References Cited

U.S. PATENT DOCUMENTS

| | | | | |
|---|---|---|---|---|
| 2,608,205 A | * | 8/1952 | Proctor | 137/375 |
| 3,512,556 A | * | 5/1970 | Mckhann | 137/71 |
| 5,049,048 A | | 9/1991 | Streicher | |
| 5,357,998 A | | 10/1994 | Abrams | |
| 5,551,484 A | | 9/1996 | Charboneau | |
| 5,640,990 A | * | 6/1997 | Rodriguez | 137/68.14 |
| 5,727,598 A | * | 3/1998 | Stuhlreyer | 138/129 |
| 5,738,304 A | * | 4/1998 | Tavano | 244/135 B |
| 6,093,002 A | | 7/2000 | Schneider | |
| 6,260,569 B1 | | 7/2001 | Abrams | |
| 6,308,753 B1 | | 10/2001 | Nimberger et al. | |
| 6,382,232 B1 | * | 5/2002 | Portmann | 137/68.13 |
| 6,546,947 B2 | | 4/2003 | Abrams | |
| 7,025,580 B2 | * | 4/2006 | Heagy et al. | 425/11 |
| 2001/0035210 A1 | | 11/2001 | Abrams | |
| 2002/0117210 A1 | | 8/2002 | Abrams | |

FOREIGN PATENT DOCUMENTS

GB  2252163  * 7/1992

* cited by examiner

*Primary Examiner* — Stephen M Hepperle
*Assistant Examiner* — Jonathan Waddy
(74) *Attorney, Agent, or Firm* — Norman E. Lehrer

(57) ABSTRACT

A safety system for a fluid conduit includes an elongated flexible conduit having a first end and a second end and a central opening running therethrough and capable of transporting a first fluid under pressure. A first valve is located near the first end of the conduit and a second valve is located near the second end of the conduit. Each of the valves is moveable between a closed position and an open position so as to control the flow of the first fluid through the conduit. The central opening of the conduit is surrounded by a conduit wall which extends substantially the entire length of the conduit. A plurality of enclosed channels are located within the conduit wall and extend at least a substantial length of the conduit. A second fluid under pressure is contained in the channels and a sensor is provided for monitoring the pressure of the second fluid within the channels. One or both of the valves are operatively associated with the second fluid and close when the monitored pressure falls below a predetermined level.

2 Claims, 1 Drawing Sheet

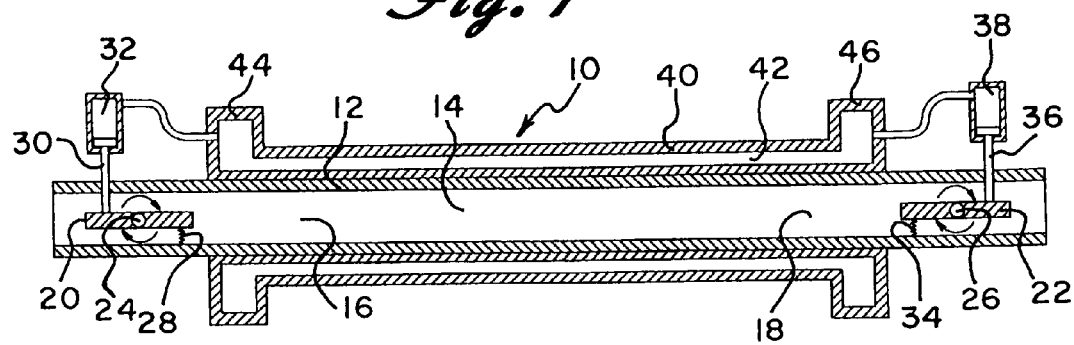
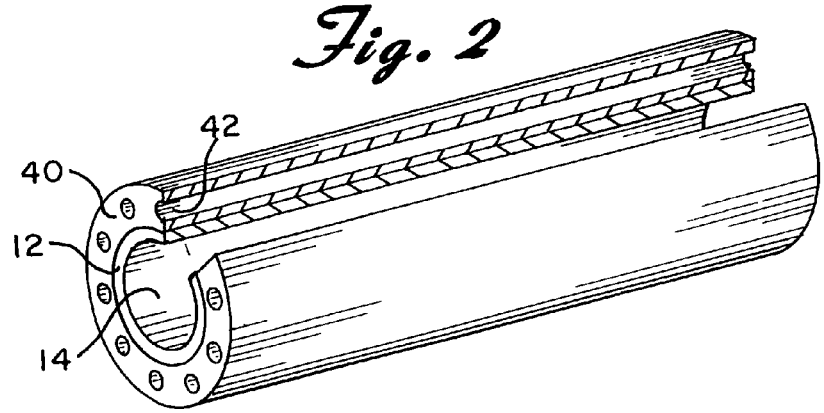
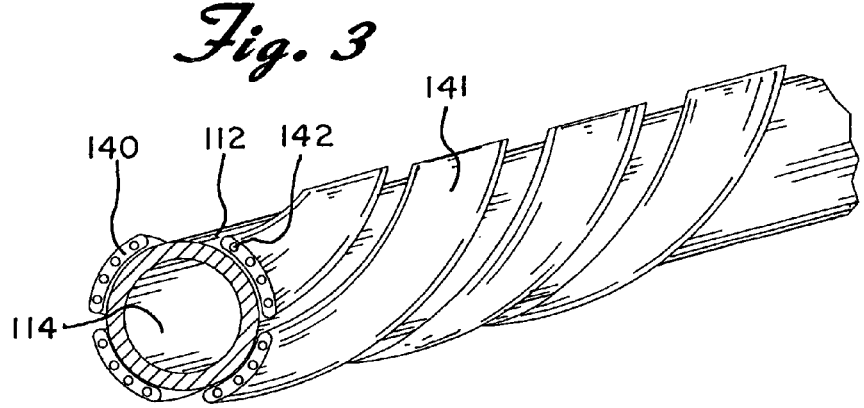

SAFETY SYSTEM FOR FLUID CONDUIT

BACKGROUND OF THE INVENTION

The present invention is directed toward a fluid delivery system and more particularly to a safety system that automatically closes one or more valves in the fluid delivery system in the event that an eminent rupture is sensed.

In the past, various techniques have been used for transferring hazardous liquids or fluids between two tanks such as, for example, between a portable roadway vehicle tank and a fixed storage tank. This is normally done utilizing flexible hoses or the like. Since the release of hazardous materials could result in a life-threatening situation, special precautions are taken to ensure that little if any of the liquid or fluid is released to the ground or atmosphere during transfer of the material along the flexible hose. While the flexible hose may be only a portion of the fluid transmission system between the tanks, is an important link in the transfer of fluids to or from a portable tank, such as mounted on a roadway vehicle.

A number of safety systems have been proposed in the past to limit or control spillage of hazardous liquids or fluids in the event of a malfunction. One prior art system marketed by Smart-Hose Technologies, Inc. utilizes a cable in compression within the hose which normally unseats valve members located at each end of the cable. In the event of hose rupture or separation, the valve members are released to stop the flow of product in both directions. The cable acts as a spring to maintain the valves off of their seats, and the separation of the hose releases the biasing force of the valves which then move to the closed position. Variations of the smart hose system are described in U.S. Pat. Nos. 5,357,998; 6,260,569 and 6,546,947.

While the Smart-Hose systems have been beneficial, they are not always entirely satisfactory. It is, for example, difficult to verify the operational integrity of the system since there is limited ability to check whether the internal cable is in proper compression. Furthermore, during handling and coiling of the hose, special care must be taken not to bend the hose or the cable or the cable will lose its ability to hold the valves open. More importantly, the valves will not close until and unless there is an almost entire rupture or separation of the hose. A partial tear or rupture in the hose wall may result in a significant amount of leakage or spillage of the hazardous material without the valves closing as the cable may continue to operate to hold the valves in their open position.

Other systems have been devised which are intended to close shutoff valves along the length of a flexible hose based upon a drop in monitored pressure (of the hazardous fluid being transported) when the hose breaks. See, for example, U.S. Pat. No. 6,308,753. However, pressure monitoring systems for automatically closing valves at the ends of a flexible hose have various reliability concerns. Near the completion of the unloading operation when the liquid level gets low in the tank, the system becomes unreliable because of liquid and vapors entering the pump in a random fashion which can cause the valves to shut off when not necessary.

With such prior art systems, the device could be manually overridden when the tank is near empty to prevent the premature trip of the shutoff valve. A separate problem, however, involves determining when the tank is near empty since the unloading time is a function of pressure and pump condition, and typically lasts for over 30 minutes. Even if one could determine when to begin the override, this will create a situation where the operator could override the device at will and defeat the purpose of a system which automatically closes the valves at the ends of the hose to prevent spillage. Moreover, even after a tank is empty, the pump is typically run for several minutes to push most of the liquid in the hose into the receiving vessel. Running a pump in this situation will thus always actuate a device that is triggered by low pressure and manual override options do not practically solve the problem.

Most significantly, however, is the fact that even such low pressure monitoring systems do not prevent the spillage of hazardous fluids or liquids. This is due to the fact that the low pressure of the transported fluid is not sensed until the hose has ruptured and a significant amount of hazardous material has already been released. Furthermore, even after the valves are closed, material remaining within the hose can be released.

As a result, a need exists for a fluid delivery system that is capable of sensing a rupture before it occurs and closing one or more valves in the fluid delivery system in order to essentially totally prevent spillage of hazardous material.

SUMMARY OF THE INVENTION

The present invention is intended to overcome the deficiencies of the prior art discussed above. It is an object of the present invention to provide a safety system for a fluid delivery system that more efficiently and more quickly closes one or more valves in the fluid delivery system to prevent spillage.

It is another object of the present invention to provide a safety system for a fluid delivery system that essentially prevents all spillage by sensing a rupture in a delivery hose before it occurs and closing one or more valves in the fluid delivery system before any spillage occurs.

In accordance with the illustrative embodiments demonstrating features and advantages of the present invention, there is provided a safety system for a fluid conduit that includes an elongated flexible conduit having a first end and a second end and a central opening running therethrough. The flexible conduit is capable of transporting a first fluid under pressure. A first valve is located near the first end of the conduit and a second valve is located near the second end of the conduit. Each of the valves is moveable between a closed position and an open position so as to control the flow of the first fluid through the conduit. The central opening of the conduit is surrounded by a conduit wall which extends substantially the entire length of the conduit. A plurality of enclosed channels are located within the conduit wall and extend at least a substantial length of the conduit. A second fluid under pressure is contained in the channels and a sensor may be provided for monitoring the pressure of the second fluid within the channels. One or both of the valves are operatively associated with the second fluid and close when the monitored pressure falls below a predetermined level. As a result, the valves shut off the flow of fluid within the conduit before a rupture and any spillage occurs.

Other objects, features, and advantages of the invention will be readily apparent from the following detailed description of preferred embodiments thereof taken in conjunction with the drawings.

BRIEF DESCRIPTION OF THE DRAWINGS

For the purpose of illustration the invention, there are shown in the accompanying drawings forms, which are presently preferred; it being understood that the invention is not intended to be limited to the precise arrangements and instrumentalities shown.

FIG. 1 is a schematic representation of the fluid delivery system of the invention;

FIG. 2 is a schematic representation of one form of hose useful with the invention, and FIG. 3 is a schematic representation of an alternative form of hose useful with the present invention.

DETAILED DESCRIPTION OF THE PREFERRED EMBODIMENTS

Referring now to the drawings in detail wherein like reference numerals have been used throughout the various figures to designate like elements, there is shown in FIG. 1 a high pressure fluid delivery system constructed in accordance with the principles of the present invention and designated generally as 10. The high pressure fluid delivery system 10 is, by way of example only as the invention is applicable to substantially any fluid delivery system from ambient pressure to extreme high pressures. In any event, the system 10 is comprised of an elongated flexible hose or conduit 12 having a central opening 14 which is capable of transporting a first fluid under pressure therethrough. The fluid is normally a liquid, but may be any substance that can be conveyed through a conduit such as a gas or loose solid material or a slurry of gas, liquid and solid. In many cases, the fluid is a hazardous material such as oil or the like that will cause injury or environmental damage if released to the environment. The conduit or hose 12 has a first end 16 and a second end 18.

A first valve 20 is located adjacent the first end 16 of the conduit 12 and a second valve 22 is located adjacent the second end 18 of the conduit. Each of the valves 20 and 22 is pivoted about the pivot point 24 and 26, respectively, so as to be movable between an open position such as shown in FIG. 1 and a closed position which would be 90° from the positions shown in FIG. 1.

First valve 20 is biased into its closed position through the use of spring 28 but is held in its open position by the piston 30 of the fluid operated cylinder 32. Similarly, spring 34 biases the second valve 22 into its closed position but is held open by the piston 36 of the fluid cylinder 38.

By the above arrangement, the valves 20 and 22 can be opened or closed based on the operation of the cylinders 32 and 38 in order to control the flow of the first fluid through the opening 14 in the hose or conduit 12. The valves 20 and 22 and the operation thereof as explained above are by way of example only. Other known valve arrangements such as described in U.S. Pat. Nos. 6,308,753 and 6,546,947 could be substituted therefor.

The hose or conduit 12 is surrounded by a conduit wall 40 which extends substantially the entire length thereof. As shown most clearly in FIG. 2, the conduit wall 40 includes at least one enclosed channel 42 that extends the entire length or at least a substantial length of the conduit. Preferably, there are numerous enclosed channels 42 which extend the length of the conduit. The channels 42 can be formed by any known process such as by extrusion at the same time that the hose or conduit 12 is being formed. As shown in FIG. 1, the channels are interconnected at the first and second ends utilizing collars 44 and 46.

A second fluid, which may be a gas under pressure or a liquid, is contained within the channels 42. This fluid under pressure is also contained within the collars 44 and 46 and the cylinders 32 and 38. As long as the second fluid within the channels 42 remains under pressure, the cylinders 32 and 38 maintain the valves 20 and 22 in their open position.

While prior art systems have been known that shut the flow of the primary fluid in the event of an entire breakage of a hose, the present system provides for the shutoff of valves long before that occurs. In the event that the conduit or hose 12 of the present invention starts to wear or it is cut as a result of being dragged on the ground or contacting a sharp object, the outer conduit wall 40 will be the first to be damaged and eventually, one or more of the channels 42 will be exposed. This will allow the second fluid that had been under pressure to escape thereby reducing the pressure in the channels 42, the collars 44 and 46 and the cylinders 32 and 38. As a result, the springs 28 and 34 will close the valves 20 and 22. The speed at which this occurs can be controlled by the sensitivity of the cylinders 32 and 38, the force of the springs 28 and 34 and numerous other factors such as the size and number of the channels 42 and of the collars 42 and 46.

An alternate embodiment of the conduit or hose 12 is shown in FIG. 3 as 112. The conduit 112 also includes a central opening 114 through which the first fluid to be transported is intended to pass. The conduit wall 140, however, is comprised of a number of spiral wraps 141 that can either be extruded with the conduit 112 or applied thereafter. In any event, these spiral wraps 141 can be considered to form a part of the conduit wall 140 and include a plurality of channels 142 therein. As with the embodiment shown in FIG. 2, the channels 142 preferably extend substantially the entire length of the hose or conduit 112 and are connected together at their ends through the use of collars such as shown in FIG. 1.

While the conduit 12 or 112 with the channels 42 or 142 has been shown as being essentially integral with the hose through which the fluid passes in the fluid delivery system, the invention is not limited thereto. It is within the scope of the present invention to apply an additional protective conduit or sleeve around an existing fluid conduit and include one or more channels in the protective sleeve. For convenience, however, such a combination is referred to herein as a conduit wall.

The present invention may be embodied on other specific forms without departing from the spirit or essential attributes thereof and accordingly, reference should be made to the appended claims rather than to the foregoing specification as indicating the scope of the invention.

We claim:

1. A safety system for use in transporting a first fluid between a fluid source and a container comprising:
    an elongated flexible cylindrically shaped hose having a central opening capable of transporting a first fluid therethrough, said flexible hose having a first end and a second end;
    a first valve located at said first end of said hose and a second valve located at said second end of said hose;
    each of said valves being moveable between a closed position and an open position so as to control the flow of said first fluid through said hose;
    said central opening of said hose being surrounded by a conduit wall integrally formed therewith, said conduit wall extending substantially the entire length of said hose;
    a plurality of enclosed channels within said conduit wall and extending substantially the entire length of said hose, each of said channels being in the form of a spiral;
    said plurality of enclosed channels each containing a second fluid under pressure;
    valve operating means operatively associated with said second fluid within said channels and sensing the pressure thereof, said operating means closing both of said valves when said sensed pressure falls below a predetermined level.

2. The safety system as claimed in claim 1 wherein said first fluid is under pressure.

* * * * *